United States Patent [19]

Yokoyama et al.

[11] Patent Number: 4,599,112
[45] Date of Patent: Jul. 8, 1986

[54] RECORDING LIQUID

[75] Inventors: Yasumasa Yokoyama, Yokohama; Tomoko Komori, Machida; Tsuyoshi Eida, Ichikawa; Shoji Koike; Masatsune Kobayashi, both of Yokohama, all of Japan

[73] Assignee: Canon Kabushiki Kaisha, Tokyo, Japan

[21] Appl. No.: 666,137

[22] Filed: Oct. 31, 1984

Related U.S. Application Data

[63] Continuation of Ser. No. 516,966, Jul. 25, 1983, abandoned.

[30] Foreign Application Priority Data

Dec. 29, 1982 [JP] Japan .............................. 57-229581

[51] Int. Cl.$^4$ ............................................ C09D 11/02
[52] U.S. Cl. ................................. 106/22; 260/245.77; 260/245.85
[58] Field of Search ............................. 106/22, 20, 23; 260/245.77, 245.85

[56] References Cited

U.S. PATENT DOCUMENTS 3,889,271  6/1975  Freytag et al. ...................... 106/22

Primary Examiner—Amelia B. Yarbrough
Attorney, Agent, or Firm—Fitzpatrick, Cella, Harper & Scinto

[57] ABSTRACT

A recording liquid containing as a coloring component a copper phthalocyanine dye having at least one alkali metal sulfonate substituent is provided. The recording liquid is characterized in that the ratio of the integrated peak areas (A/B) in a liquid chromatogram of said dye is at least 1/6, wherein, provided that the retention time of the main peak is taken as 1.00, A and B represent the integrated peak area of the relative retention time of from 0 to 0.80 and that of from 0.85 to 4.00, respectively.

5 Claims, 5 Drawing Figures

RECORDING LIQUID

This application is a continuation of application Ser. No. 516,966, filed July 25, 1983.

BACKGROUND OF THE INVENTION

1. Field of the Invention

This invention relates to a recording liquid suited for ink-jet recording which is performed by ejecting ink droplets from a recording head through its orifices, or for other recording by means of a writing tool such as a pen.

2. Description of the Prior Art

Ink-jet recording generates less noise and permits a high speed recording on plain paper without the necessity for any special fixing treatment, so that various types of ink-jet recording systems are being investigated energetically.

The recording liquid used for these ink-jet recording systems needs to fulfill the following requirements such that its physical properties such as viscosity, surface tension, etc. should be each within a proper range, it should not clog a fine spout (orifice), it should form images of bright color tone and of sufficiently high optical density, and it should not undergo a change in physical properties or deposit solid matter, during storage.

In addition, the recording liquid is desired to meet the following requirements as recording therewith should be accomplished without particular restriction of the kind of recording medium, including paper, which is the most typical recording medium, it should exhibit a high rate of fixing on recording media, it should give images excellent in resistances to water, solvent (particularly alcohol), light, and attrition, and it should form images with a high degree of resolution.

Since the recording liquid used for ink-jet recording is composed basically of a coloring component dye and its solvent, the above performance characteristics required are much affected by inherent properties of the dye. Accordingly, it is very important in the art to select a dye so as to provide the recording liquid with the above performance characteristics.

The solubility of the dye in the liquid medium is particularly important; it is essential for maintaining a good anti-clogging property and solution stability of the recording liquid that the dye be sufficiently soluble in water as well as in the wetting agent used, which is generally composed of an organic solvent.

On the other hand, for forming full-color images in ink-jet recording, the recording liquids containing three primary colors (magenta, yellow and cyan) or four primary colors (magenta, yellow, cyan and black) are used, wherein the color tone of a recorded image is governed by subtractive mixing of these recording liquids. In order to form images of desired color tone, these recording liquids are required to have ideal hues of primary colors, as magenta, yellow and cyan, respectively, and a high degree of chroma. Therefore, the proper selection of dyes taking the hues of recording liquids into consideration is also very important in the art.

However, almost none of the existing recording liquids of cyan color, in particular those containing a phthalocyanine dye as a coloring component, satisfy the above noted requirements, particularly with respect to the solubility and the color. Thus, a cyan color recording liquid meeting the above requirements has been strongly desired.

SUMMARY OF THE INVENTION

An object of this invention is to provide a recording liquid, excellent in the solubility of the coloring component in the liquid components and in the long-term solution stability, used for ink-jet recording or others such as writing with a pen or the like.

Another object of this invention is to provide a recording liquid of cyan color, which does not tend to clog discharging orifices, for full-color ink-jet recording.

According to one aspect of this invention, there is provided a recording liquid containing as a coloring component a copper phthalocyanine dye having at least one alkali metal sulfonate substituent, characterized in that the ratio of the integrated peak areas (A/B) in a liquid chromatogram of said dye is at least 1/6, wherein, provided that the retention time of the main peak is taken as 1.00, A and B represent respectively the integrated peak area of the relative retention time of from 0 to 0.80, and that of from 0.85 to 4.00.

DETAILED DESCRIPTION OF PREFERRED EMBODIMENTS

Figure 1:
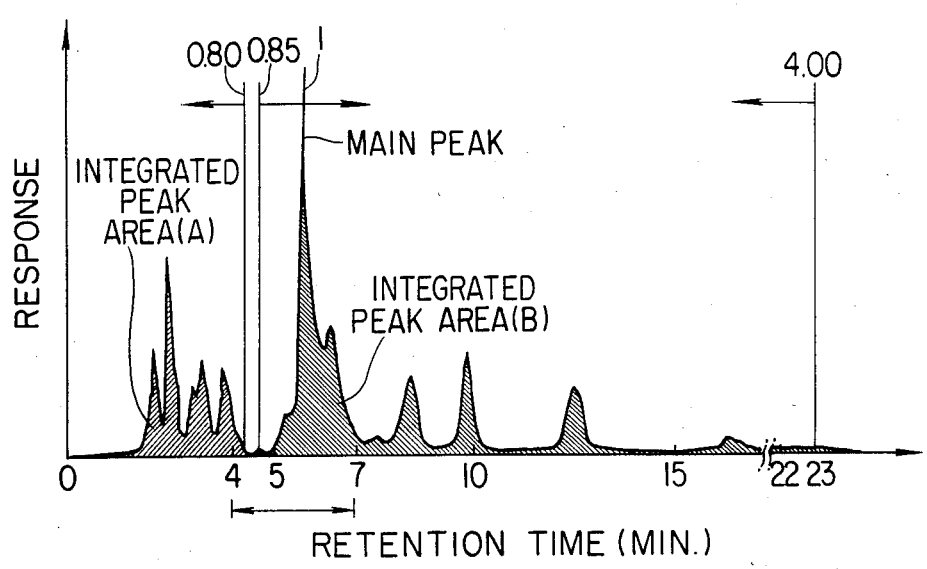
FIG. 1 is a schematic illustration for showing the criterion for evaluating dyes used in the recording liquid based on their liquid chromatogram.

The liquid chromatographic analysis of copper phthalocyanine dyes in this invention is carried out in the following manner: The mobile phase is a mixture of 0.15% aqueous solution of dibutylamine carbonate and acetonitrile in a V/V ratio of 4/1, the flow rate of the mobile phase is 1 ml/min., the column is an ODS (treated with octadecylsilane) silica gel column of 4.6 mm in diameter and 150 mm in length, and the wavelength of the detecting ultraviolet ray is 340 nm. The main peak of the liquid chromatogram in this invention means the greatest peak observed between retention times of 4 and 7 minutes. The integrated peak areas A and B are determined in the liquid chromatographic analysis under the above conditions. These are schematically shown in FIG. 1. A and B represent respectively the integrated peak area of the relative retention time of from 0 to 0.80, and that of from 0.85 to 4.00 when the retention time of the main peak is taken as 1.00.

For the alkali metal in sulfonate substituents in the copper phthalocyanine dye of this invention, sodium, potassium, and lithium are preferred, though rubidium may also be used. The dye, used in this invention, having at least one alkali metal sulfonate substituent on the copper phthalocyanine nucleus is generally obtained as mixtures of copper phthalocyanines each having several of said substituents. While chemical structural formulae and compositions of the mixtures are not clear, the solubility and solution stability of the dye increase with an increase in the ratio A/B, which is determined by measuring the integrated peak areas A and B as stated above. While the dye with a ratio A/B of 1/6 (0.167) or more has characteristics satisfactory for use in the recording liquid, the ratio A/B is preferably ¼ (0.25) or more.

The copper phthalocyanine dye, used in this invention, having at least one alkali metal sulfonate substituent and a ratio A/B of 1/6 or more can be produced according to known processes; for example, by reacting copper phthalocyanine with chlorosulfonic acid, followed by hydrolyzing the chlorosulfonated product, and neutralizing the product under the reaction conditions suitably adjusted.

The content of the above dye as a coloring component to be used in the recording liquid, depends on the kinds of liquid medium components, the characteristics required for the recording liquid, etc., and is in the range of generally 0.5-20%, preferably 0.5-15%, and particularly 1-10%, by weight based on the total weight of the recording liquid.

The recording liquid in this invention contains water as the main liquid component. The liquid may consist of water alone or preferably a mixture of water with a water-miscible organic solvent.

Water-miscible organic solvents suitable for the liquid medium include, for example; aliphatic alcohols having one to four carbon atoms such as methanol, ethanol, n-propanol, isopropanol, n-butanol, sec-butanol, tert-butanol, and isobutanol; amides such as dimethylformamide and dimethylacetamide; ketones or keto-alcohols such as acetone and diacetone alcohol; ethers such as tetrahydrofuran and dioxane; polyalkylene glycols such as polyethylene glycol and polypropylene glycol; glycols of $C_2$-$C_6$ alkylenes such as ethylene glycol, propylene glycol, butylene glycol, triethylene glycol, 1,2,6-hexanetriol, thiodiglycol, hexylene glycol and diethylene glycol; glycerol; and lower-alkyl ethers of polyhydric alcohols such as ethylene glycol methyl ether, diethylene glycol methyl (or ethyl) ether, and triethylene glycol monomethyl (or ethyl) ether.

Preferred solvents among these are polyhydric alcohols including diethylene glycol and lower alkyl ethers of polyhydric alcohols including triethylene glycol monomethyl (or ethyl) ether. Polyhydric alcohols are particularly preferable because these are especially effective as wetting agents for preventing the orifice from clogging which will be caused by the vaporization of water from recording liquids and the deposition of the coloring component.

The content of the water-miscible organic solvent in the recording liquid is in the range of generally 5-95%, preferably 10-80%, and particularly 20-50%, by weight based on the total weight of the recording liquid.

The water content in the liquid is decided depending on the kind and composition of the above solvent and the characteristics required for the recording liquid in a wide range of generally 10-90%, preferably 10-70%, and particularly 20-70%, by weight based on the total weight of the recording liquid.

A solubilizing agent may be added to the recording liquid of this invention. Typical preferable solubilizing agents are nitrogen-containing heterocyclic ketones such as N-methyl-2-pyrrolidone, 1,3-dimethyl-2-imidazolidinone and the like. The role of the solubilizing agent is to increase markedly the solubility of the coloring component in the liquid medium.

The recording liquid in this invention, prepared from the components mentioned above in itself has excellent and balanced recording performance characteristics (signal responsiveness, stability of droplet formation, discharge stability, long-time continuous recording workability, and discharge stability after a long rest), storage stability, fixability on recording media, and resistances of the resulting images to light, weather and water. For further improving these characteristics, known various additives may also be incorporated into the recording liquid. The examples of these additives are viscosity modifiers such as polyvinyl alcohol, cellulosic materials, and other water-soluble resins; various types of cationic, anionic and nonionic surfactants; surface tension modifiers such as diethanolamine and triethanolamine; and pH regulators containing buffer solutions.

When the recording liquid is used in the ink-jet recording system which discharges a recording liquid by the action of thermal energy, thermal properties (e.g. specific heat, thermal expansion coefficient, and heat conductivity) of the recording liquid may be adjusted if necessary.

While having excellent characteristics for ink-jet recording, the recording liquid of this invention may also be used favorably for writing on recording media such as paper by means of writing tools such as fountain pens, felt pens and the like.

This invention is illustrated in more detail with reference to the following Preparation Examples and Examples: In these examples, all "parts" and "%" are by weight.

PREPARATION EXAMPLE 1

Into 400 parts of chlorosulfonic acid, 50 parts of copper phthalocyanine was added and the reaction mixture was heated with stirring at 125°-130° C. for 4 hours. The reaction mixture, after standing to cool, was gradually added dropwise into a mixture of 500 parts of water and 2000 parts of ice, and it was filtered. The filter cake, washed with cold water, was added into an equivalent amount of 5% aqueous sodium hydroxide solution to be neutralized. The solvent was then evaporated off, the solid residue was dissolved in ethylene glycol monomethyl ether, the solution was filtered through qualitative filter paper No. 2 (manufactured by Toyo Kagaku Sangyo K.K.), and the solvent was again evaporated from the filtrate. Thus, sodium salt of a copper phthalocyanine dye having sulfonic acid groups was obtained (Dye I).

Figure 2:
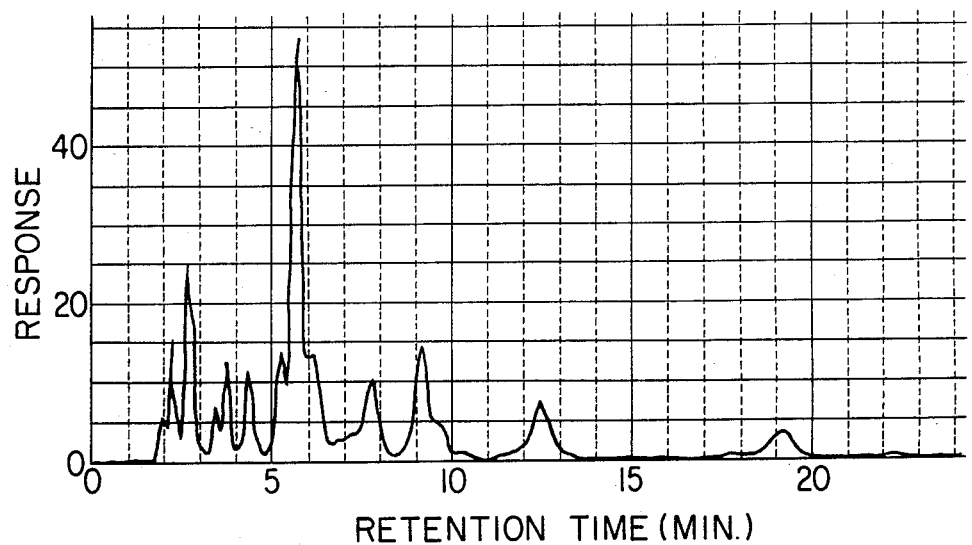
FIGS. 2 to 4 show liquid chromatograms of the dyes used in the recording liquid of this invention.

An aqueous solution containing 0.4% of Dye I was analyzed by liquid chromatography under the following conditions. The chromatogram was as shown in FIG. 2, in which the area ratio A/B was found to be 1/2.8.

OPERATION CONDITIONS OF CHROMATOGRAPHY

Apparatus: Hitachi model 635 high-speed liquid chromatograph

Column: ODS silica gel (Senshupack Nucleosil 5C$_{18}$, supplied by Senshu Kagaku K.K.) 4.6 mm$\phi \times$150 mmL Mobile phase: A mixture of 0.15% aqueous solution of dibutylamine carbonate and acetonitrile in a V/V ratio of 4/1

Flow rate: 1 ml/min

Wavelength of detecting UV: 340 nm

Sample volume: 5 $\mu$l

PREPARATION EXAMPLE 2

Figure 3:
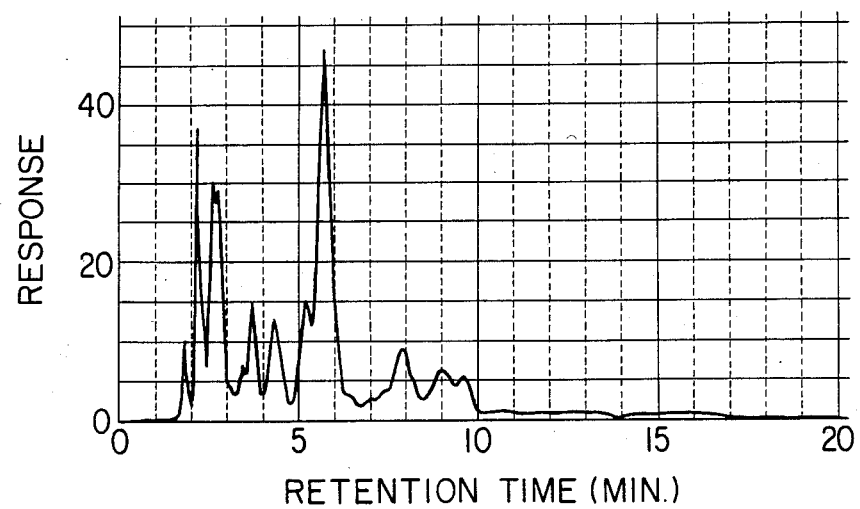

Reaction was conducted at 200° C. for 2 hours by stirring 150 parts of 4-sulfophthalic acid, 135 parts of urea, 24 parts of cupric chloride, and 0.5 part of ammonium molybdate with 300 parts of trichlorobenzene. The hot reaction mixture was filtered and the filter cake was treated in the same manner as in Preparation Example 1, giving Dye II. The liquid chromatogram of Dye II obtained under the same conditions as in Preparation Example 1 is shown in FIG. 3. The area ratio A/B was 1/1.4

PREPARATION EXAMPLE 3

Figure 4:
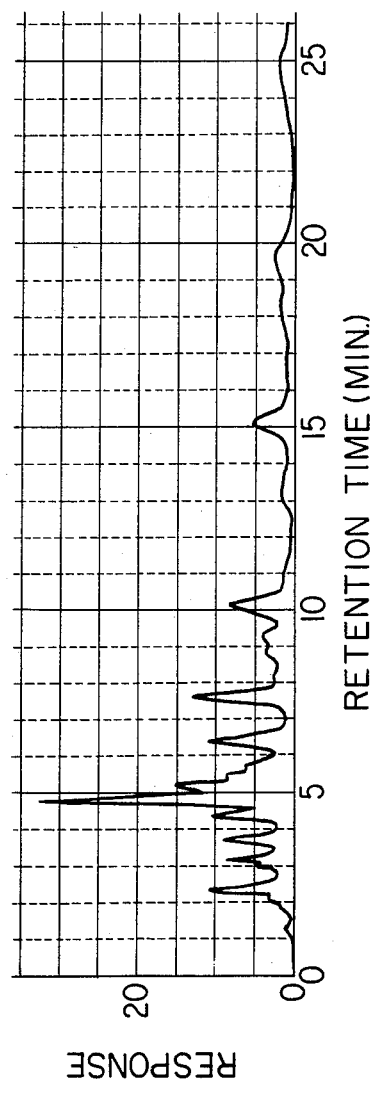

Dye III was prepared by dissolving a commercial dye Aizen Primula Turquoise Blue GHL (manufactured by Hodogaya Chemical Co., Ltd.) in ethyleneglycol monomethyl ether, filtering the solution through a qualitative filter paper No. 2 (manufactured by Toyo Kagaku Sangyo K.K.), and evaporating the solvent from the filtrate. The liquid chromatogram of Dye III obtained under the same conditions as in Preparation Example 1 is shown in FIG. 4. The area ratio A/B was 1/5.1.

COMPARATIVE PREPARATION EXAMPLE 1

Figure 5:
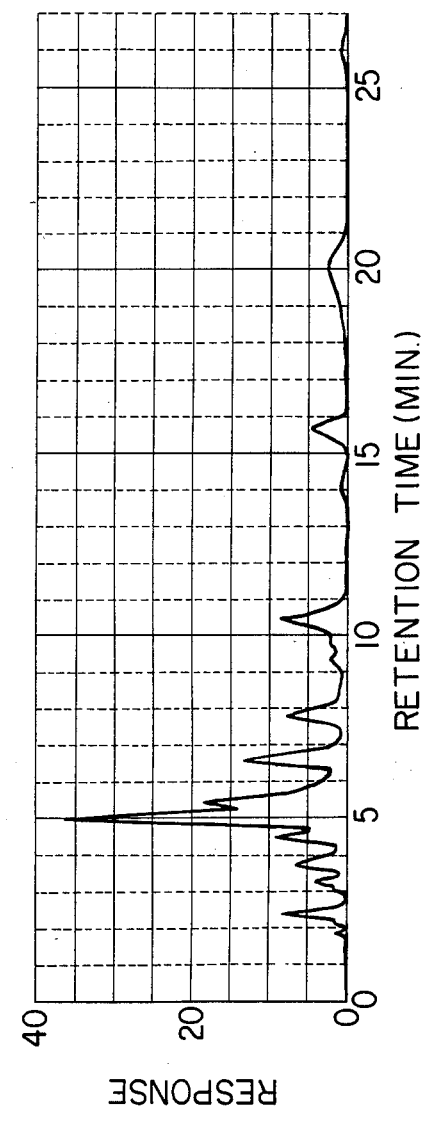
FIG. 5 is a liquid chromatogram of a comparative sample.

Dye IV was prepared from a commerical C.I. Direct Blue 86 (mfd. by Chugai Kasei Co., Ltd.) in the same manner as in Preparation Example 3. The liquid chromatogram of Dye IV obtained under the same conditions as in Preparation Example 1 is shown in FIG. 5. The area ratio A/B was 1/6.7.

EXAMPLE 1

A primary cyan color recording liquid for ink-jet recording was prepared according to the following formulation with Dye I obtained in Preparation Example 1:

Dye I: 2.5%
Diethylene glycol: 30.0%
N-Methyl-2-pyrrolidone: 15.0%
Deionized water: 52.5%

The above amounts of the components were thoroughly mixed to form a homogeneous solution, which was then filtered through a FLUOROPORE filter (manufactured by Sumitomo Electric Ind., Ltd.) having a nominal pore size of 0.45μ. The filtrate was degassed and made up into a recording liquid.

This recording liquid was tested for its discharge stability by using an ink-jet recorder equipped with an on-demand type of recording head which ejects recording liquid droplets by means of a piezoelectric oscillator (orifice diameter: 50μ, piezoelectric oscillator driving voltage: 60 V, frequency: 4 KHz). As a result, this recording liquid maintained good discharge stability in both cases of continuous discharge for 48 hours and intermittent discharge for 24 hours, at surrounding temperatures of 5°, 21° (room temperature), 40°, and 60° C., under a relative humidity of 30%.

The printed letters exhibited an ideal clear and bright cyan color and such good light resistance that the letters could sufficiently be read after 50 hour exposure in a xenon Fade-O-Meter.

EXAMPLE 2

In the same manner as in Example 1, a primary cyan color recording liquid was prepared according to the following formulation:

Dye III: 3.0%
Diethylene glycol: 15.0%
1,3-dimethyl-2-imidazolidinone: 15.0%
Polyethylene glycol (average mol. wt. 300): 15.0%
Deionized water: 52.0%

Recording liquids of the primary colors, yellow, magenta and black, were also prepared in the same way as the above except that C.I. Acid Yellow 23 for yellow, C.I. Acid Red 143 for red and C.I. Direct Black 19 for black primary color respectively, in an amount of 3% in place of Dye III.

Color printing tests were conducted by feeding these recording liquids to an ink-jet recorder equipped with multi-heads of on-demand type which ejects recording liquid droplets by the action of thermal energy (orifice diameter 35μ, electric resistance of the heater 150Ω, operational voltage 30 V, frequency 2 KHz). The results revealed that the discharge stability was good in all cases under the same conditions as in Example 1. The resulting full-color images had the intended colors, whereby these recording liquids were found to be excellent as primary color liquids for use in subtractive color mixing. The same light exposure test as in Example 1 showed that the printed letters could also sufficiently be read after said exposure.

EXAMPLE 3

The solubilities of Dyes I, II, III and IV obtained in Preparation Examples 1-3 and Comparative Preparation Example 1 and the storage stabilities of the recording liquids prepared from these dyes were evaluated in the following ways:

The solubility was evaluated by placing 8 g of a sample dye and 100 g of a mixed solvent consisting of 15% of diethylene glycol, 15% of N-methyl-2-pyrrolidone, 15% of polyethylene glycol (average mol. wt. 300), and 55% of distilled water in a beaker, stirring the mixture for 2 hours to dissolve the sample dye, and inspecting the presence of precipitate after 1 hour standing. When no precipitate was observed, the sample was rated as O. When a precipitate was observed, 100 g of the mixed solvent mentioned above was further added to the liquid, and the mixture was stirred for 2 hours and allowed to stand for 1 hour to inspect it. If the precipitate disappears in this case, the sample was rated as Δ. If a precipitate was still present, the sample was rated as X.

The storage stability was examined as follows: A sample dye was added to the mixed solvent mentioned above to give a dye concentration of 4%, the mixture was stirred for 2 hours and filtered through a FLUOROPORE filter (manufactured by Sumitomo Electric Ind., Ltd.) having a nominal pore size of 1.0μ, and the filtrate was degassed and sealed in hard glass bottles. The respective samples were stored at 80° C. for 3 months, at 25° C. for 6 months, or at 0° C. for 6 months, and at the end of the test period, they were examined for the presence of a precipitate on the bottom or side wall in bottles.

Results of these tests are shown in Table 1.

TABLE 1

| Dye No. | Area ratio A/B | Solubility rating | Storage stability 0° C. | 25° C. | 80° C. |
| --- | --- | --- | --- | --- | --- |
| I | 1/2.8 | | No ppt. | No ppt. | No ppt. |
| II | 1/1.4 | | " | " | " |
| III | 1/5.1 | Δ | " | " | A little ppt. was present. |
| IV | 1/6.7 | X | " | Ppt. was present | Much ppt. was pre- |

TABLE 1-continued

| Dye No. | Area ratio A/B | Solubility rating | Storage stability 0° C. | 25° C. | 80° C. |
|---|---|---|---|---|---|
| | | | | | sent. |

("ppt" means precipitate.)

As described above in detail, this invention provides a recording liquid which has the following advantages: its viscosity and surface tension are each in a proper range; it does not clog a fine orifice; it gives sufficiently dense images; during storage, no change occurs in its physical properties and no precipitate forms; it is applicable on various recording media without no particular restriction; and it gives images quickly fixable and excellent in resistances to water, light and attrition and in degree of resolution.

What we claim is:

1. A recording liquid containing as a coloring component a copper phthalocyanine dye having at least one alkali metal sulfonate substituent, characterized in that the ratio of the integrated peak areas (A/B) in a liquid chromatogram of said dye is at least 1/6, wherein, provided that the retention time of the main peak is taken as 1.00, A represents the integrated peak area of the relative retention time of from 0 to 0.80, and B represents the integrated peak area of the relative retention time of from 0.85 to 4.00.

2. The recording liquid of claim 1, wherein the ratio A/B is at least 1/4.

3. The recording liquid of claim 1, wherein said coloring component is contained in an amount of 0.5-20% by weight based on the entire weight of the recording liquid.

4. The recording liquid of claim 1, further comprising water and a water-miscible organic solvent as liquid medium components.

5. A method for recording comprising discharging a recording liquid containing as a coloring component a copper phthalocyanine dye having at least one alkali metal sulfonate substituent, characterized in that the ratio of the integrated peak areas (A/B) in a liquid chromatogram of said dye is at least 1/6, wherein, provided that the retention time of the main peak is taken as 1.00, A represents the integrated peak area of the relative retention time of from 0 to 0.80, and B represents the integrated peak area of the relative retention time of from 0.85 to 4.00, through a fine nozzle onto a surface of a recording medium.

* * * * *

UNITED STATES PATENT AND TRADEMARK OFFICE
CERTIFICATE OF CORRECTION

PATENT NO. : 4,599,112
DATED    : July 8, 1986
INVENTOR(S) : YASUMASA YOKOYAMA, ET AL.

It is certified that error appears in the above-identified patent and that said Letters Patent is hereby corrected as shown below:

COLUMN 5

Line 12, "1/1.4" should read --1/1.4.--

COLUMN 6

Lines 61-67, "Solubility" should read --Solubility--

| rating | rating |
|---|---|
|  | o |
|  | o |
| Δ | Δ |
| x | x |

COLUMN 7

Line 13, "no" should read --any--.

Signed and Sealed this

Twenty-first Day of April, 1987

*Attest:*

DONALD J. QUIGG

*Attesting Officer*   *Commissioner of Patents and Trademarks*